PROTECTIVE DEVICE FOR FIRE HYDRANTS

Original Filed Aug. 29, 1968 2 Sheets-Sheet 1

INVENTOR.
RAUL RALPH DIAZ

BY

Roberts & Cohen

ATTORNEYS

PROTECTIVE DEVICE FOR FIRE HYDRANTS

Original Filed Aug. 29, 1968 2 Sheets-Sheet 2

INVENTOR.
RAUL RALPH DIAZ

BY

Roberts & Cohen
ATTORNEYS

United States Patent Office

Re. 27,616
Reissued Apr. 17, 1973

27,616

PROTECTIVE DEVICE FOR FIRE HYDRANTS

Raul Ralph Diaz, Brooklyn, N.Y., assignor to Angelo Soto, Brooklyn, N.Y.

Original No. 3,556,131, dated Jan. 19, 1971, Ser. No. 756,214, Aug. 29, 1968. Application for reissue Feb. 1, 1971, Ser. No. 111,776

Int. Cl. F16k *35/06*

U.S. Cl. 137—382.5 2 Claims

Matter enclosed in heavy brackets [ ] appears in the original patent but forms no part of this reissue specification; matter printed in italics indicates the additions made by reissue.

ABSTRACT OF THE DISCLOSURE

A device is provided for preventing the unauthorized operation of fire hydrants by concealing the hexagonal member or nut which permits the operation of the fire hydrant and permitting only a limited access thereto. The nut is concealed by connecting thereto a first member which is fixed thereon both axially and rotatably and by supporting on this first member a freely rotatable member which conceals the first member and prevents a rotative force from being applied to the nut. A special wrench is provided which enables authorized engagement of the nut through the limited access which is provided.

*DRAWING*

DETAILED DESCRIPTION

This invention relates to protective devices for preventing unauthorized access to and operation of fire hydrants.

During warm weather periods, dangerous conditions *sometimes* arise due to the unauthorized operation of fire hydrants for purposes other than those originally intended. For example, if unauthorized operation of many fire hydrants occurs, substantial water pressure may be lost, thereby placing fire department equipment at a disadvantage in connection with the fighting of fires and so forth.

It is one object of the invention to provide means for preventing the unauthorized operation of fire hydrants while at the same time affording convenient access to the same by authorized personnel such as firemen, policemen and the like.

It is another object of the invention to provide a protective device which can be readily installed upon existing fire hydrants without need for making special provisions in the conventional structures of the same.

Yet another object of the invention is to provide an improved kit consisting of a protective device for fire hydrants and a special wrench or other such tool by means of which fire hydrants can be conveniently operated despite the use of the protective devices of the invention.

To achieve the above and other objects of the invention, there is proposed a protective device consisting of a number of parts, one of which is rotatably and axially fixed to the operating hexagonal nut of a fire hydrant, the remainder of these parts cooperating with the first said part to constitute a rotatable member which conceals the major portion of the operating nut of the hydrant while exposing a minimal portion of the same through an access into which can be inserted the special operating wrench of the invention.

The rotatable portion of the protective device affords protection in that rotatable forces intended to rotate the aforesaid operational nut are dissipated without rotating the nut thereby preventing operation of the hydrant. As a result, only authorized personnel having the necessary tool can open the protected hydrant and cause water to issue from the same.

Advantageously the protective device of the invention is readily manufactured by mass production techniques and can therefore be manufactured at relatively low cost.

As an additional advantage of the invention, the affixing of protective devices to fire hydrants can be accomplished in a very simple and inexpensive manner.

The above objects, advantages and features of the invention will be better understood from the folowing detailed description of a preferred embodiment of the invention as illustrated in the accompanying drawing.

Figure 1:
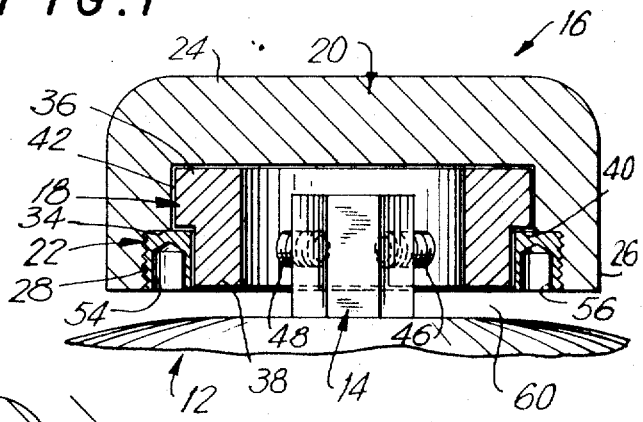
FIG. 1 illustrates a fire hydrant with a protective device of the invention connected thereon, the protective device being illustrated in sectional view.

In FIG. 1 appears the upper portion 10 of a fire hydrant generally indicated at 12. This fire hydrant conventionally includes a polygonal opening member such as hexagonal nut 14, the rotation of which will cause the fire hydrant to be opened and water to issue therefrom in conventional manner.

It is well known that, in the summer months, fire hydrants are *sometimes* operated by unauthorized persons to cause the issuance of water which is used for recreational purposes. Although these purposes may be of interest to certain persons, the concurrent use of a number of such hydrants in a particular geographical location will cause the lowering of water pressure thereby creating a dangerous situation in which insufficient water pressure is available.

To prevent the unauthorized operation of such fire hydrants, in accordance with the invention, there is provided a protective device generally indicated at 16. This protective device consists of three elements generally indicated at 18, 20 and 22, reference also being made to FIGS. 2–4.

Figure 2:
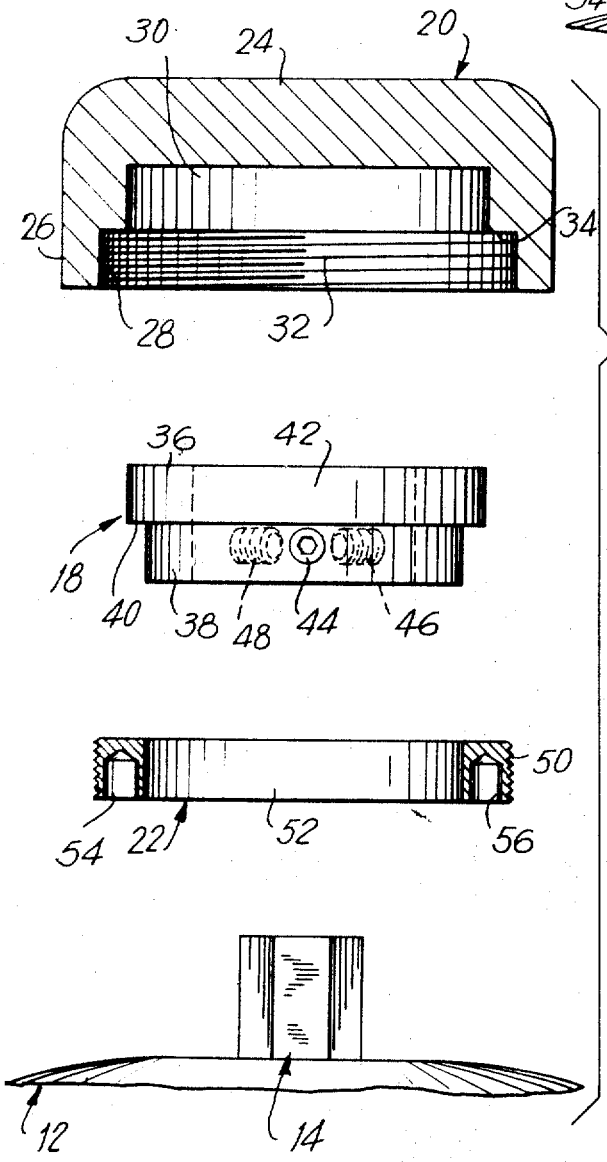
FIG. 2 is an exploded view showing the elements of the protective device of the invention in association with the hexagonal head of the fire hydrant.

As best seen in FIG. 2, part 20 consists of a dome-like section 24 and a depending skirt 26, having an internal thread indicated at 28. Part 20 has an internal recess 30 and a lower larger recess 32, these two recesses being separated by a shoulder 34.

The part 20 may be fabricated of a variety of materials such as iron, steel, brass and the like. Plastics may also be employed, providing they have the requisite strength to resist destruction by unauthorized personnel.

The part 18, which is the part directly engaging the nut of the associated fire hydrant, consists of an upper cylindrical part 36 and a lower cylindrical part 38, there being formed therebetween a shoulder 40. Part 18 has a cylindrical opening or bore passing axially therethrough and indicated at 42. The parts 18 and 20 are so shaped as to be engageable in concentric, coaxial relationship.

Extending radially through the part 18 are a number of threaded bolts such as indicated at 44, 46 and 48, the purposes of which will become hereafter apparent. These threaded bolts may be adjusted in a variety of ways, one of which is the provision of a hexagonal axial recess in the outer extremities thereof for accommodating an Allen wrench.

Figure 3:
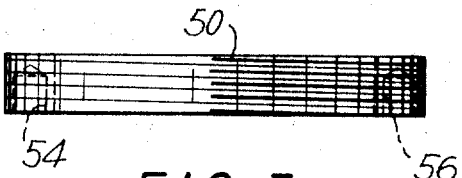
FIG. 3 is a side view of one of the elements of FIG. 2.
Figure 4:
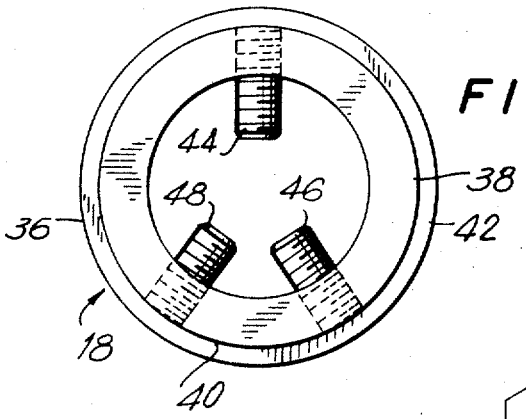
FIG. 4 is a bottom view of another of the elements of FIG. 2.

The part 22 (FIG. 2) is a ring having an externally threaded periphery as indicated at 50. Ring 22 has a cylindrical bore 52 passing therethrough. FIG. 3 is a further view of the ring 22 illustrating the threaded portions 50 and moreover indicating the provision of axially disposed recesses 54 and 56 therein. The two recesses 54 and 56 are illustrative only of the number of such recesses which may be provided in the ring 22.

The outer diameter of the upper portion 36 of the element is such that it is snugly but rotatably accommodated within recess 34. The height of the section 36 is substantially equal to the depth of the recess 30, the shoulder 40 coming to lie in substantially coplanar relationship with the shoulder 34, as best seen in FIG. 1.

The outer periphery of the part 38 of element 18 is such as to define with the threaded portion 28 of part 20, an annular recess in which is accommodated the ring 22, the thread 50 thereof engaging with the thread 28. The threaded engagement is preferably reversed from the usual threaded engagement.

The rings 18 and 22 are preferably made of a substantially indestructible material such as employed in the fabrication of the element 20.

For purposes of installation, the ring 18 is placed on the nut 14 in encircling relationship therewith, whereupon the bolts 44, 46 and 48 are screwed inwardly to engage the periphery of the nut 14. This engagement is made sufficiently tight that the ring 18 cannot be pulled axially from the nut 14. Due to the polygonal shape of the nut 14, rotation between the element 18 and the nut 14 will likewise be impossible after the bolts 44, 46 and 48 have been tightened *so that, in effect, nut 14 and ring constitute a unit.*

Before the installation of the ring 18, however, the ring 22 is placed around the nut 14 so that when the ring 18 has been fastened on the nut 14 the ring 22 cannot be removed from the resulting assembly.

Thereafter, the element 20 is placed over the aforegoing elements and the ring 22 is brought into threaded engagement with the interior thread 28 note hereinabove.

The provision of recesses 54 and 56 enables an appropriately shaped fork (not shown) to be inserted into the gap 60, which is intentionally provided as will be noted hereinafter, so that the ring 22 can be held in stationary attitude relative to the element 20, whereupon rotation of the latter will bring the elements 20 and 22 into firmly engaged relationship.

The bringing together of parts 20 and 22 sandwiches therebetween the upper part 36 of the element 18. As a result, the two elements 20 and 22 are axially fixed relative to the part 18, although being rotatable thereupon. As a result, any rotational force applied to the outer element 20 will not be transmitted to the element 18 and such rotational force will thus be isolated from the nut 14. Accordingly, the way to rotate nut 14 will be through the limited space 60 which is deliberately provided by attaching the element 18 to the nut 14 with the bottom of element 18 spaced from the main body of the hydrant. The space 60 may have, for example, a breadth of about one-fourth of an inch.

Figure 5:
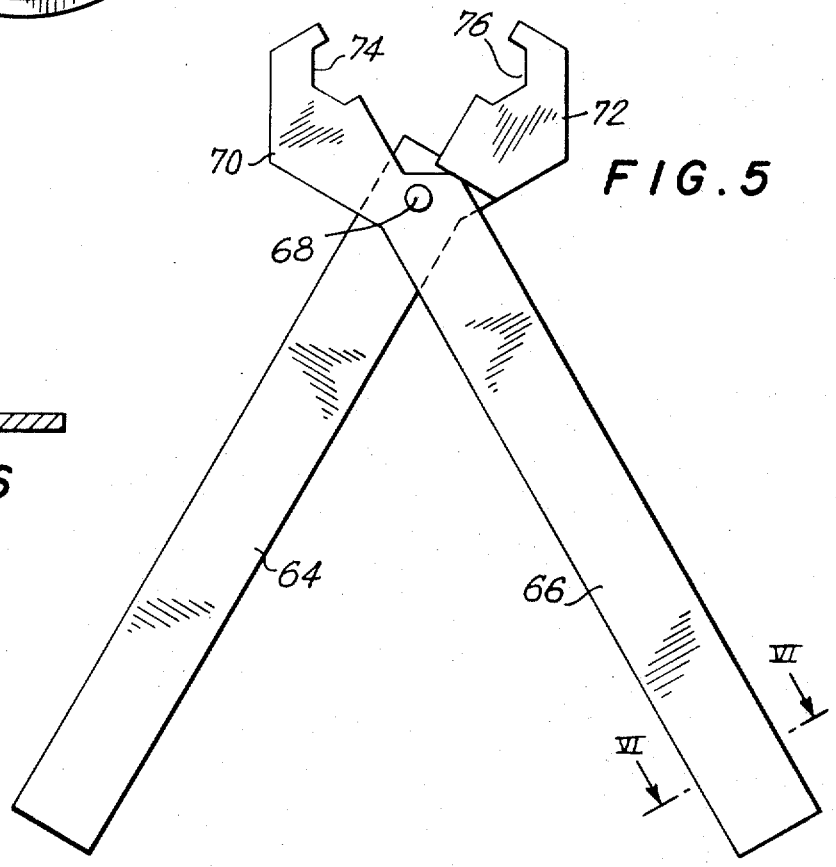
FIG. 5 is a top view of a wrench provided in accordance with the invention.
Figure 6:
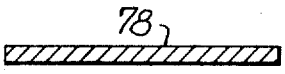
FIG. 6 is a sectional view taken along line VI—VI of FIG. 5.
Figure 7:
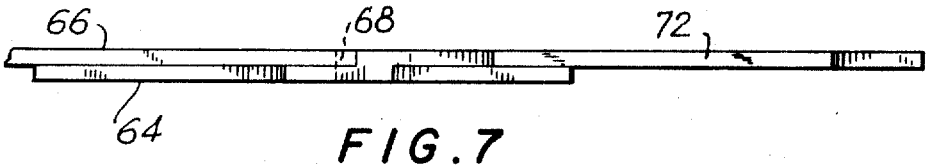
FIG. 7 is a side view of a portion of the wrench at the operative end thereof.

Authorized personnel will be able to engage the nut 14 and operate the same only by the use of a specially provided flat wrench such as appears in FIGS. 5–7. Therein appear two metal strips 64 and 66 pivoted on a member 68 and including operational end portions 70 and 72 provided with recesses 74 and 76 which cooperatively define a polygonal configuration conforming to the outer periphery of the nut 14. As seen in FIG. 6, these strips have flat rectangular cross-sections indicated at 78.

FIG. 7 illustrates that the nut engaging portion of one strip, for example 64, is an offset end portion 72, the end portion 72 lying in the same plane as the other strip 66. The end portions 70 and 72 being coplanar are, further, of such dimensions as to enable the accommodation thereof in the opening 60. The nut 14 may be readily engaged by the above-described wrench and a rotatable opening force applied to the same through gap 60.

It will be seen that the protective devices of the invention can be readily installed upon fire hydrants already in use. The only special assembly tool which is required is a fork (not shown) with bent tips enabling axial engagement of the recesses 54 and 56 so that the ring 22 can be held stationary to permit threaded coupling of the same with element 20.

There will now be obvious to those skilled in the art many modifications and variations of the construction set forth above. These modifications and variations will not depart from the scope of the invention if defined by the following claims.

I claim:

1. For use with a fire hydrant which includes a polygonal opening member, an arrangement including a protection device to avoid unauthorized access to and manipulation of said member, said protection device comprising a ring adapted for being fixed against axial and rotative movement on said member and in encircling relation therewith, and means encircling and freely rotatable on said ring, said means being locked axially on said ring in capping relation with and substantially concealing the latter, said means and ring cooperatively concealing said opening member but exposing a limited portion of the same, said ring including a shoulder portion and said means including two threadably engaged elements sandwiching said shoulder portion therebetween, one of said elements including a dome and a skirt depending from said dome and having an interior thread, said skirt defining with said ring an annular space, the other of said elements being a threaded ring positioned in said annular space and threadably engaging said skirt and provided with at least one exposed and axially disposed recess, and threaded bolts extending through the first said ring for engaging said opening member and locking the first said ring thereon, said one element including a recess wherein is accommodated the shoulder portion of the first said ring and a second contiguous recess encircled by said skirt, said one element including a shoulder between said recesses. said other element abutting axially against the shoulder of said one element and against the shoulder of the first said ring.

2. *For use with a fire hydrant which includes a polygonal opening member, an arrangement including a protection device to avoid unauthorized access to and manipulation of said member, said protection device comprising first means adapted for being fixed against axial and rotative movement on said member to form a unit therewith, and second means encircling and freely rotatable on said first means but being locked axially on said first means in capping relation with the same, said second means exposing a limited portion of said unit for manipulation of said opening member, said first means including a shoulder portion and said second means including two threadably engaged elements accommodating said shoulder portion therebetween, one of said elements including a dome and a skirt depending from said dome, said skirt defining with said first means an annular space, the other of said elements being a ring positioned in said annular space and detachably connected with said one element to trap said shoulder in said skirt. said one element being provided with a recess wherein is accommo-*

*dated the shoulder portion of the said first means and a second contiguous recess encircled by said skirt, said one element including a shoulder between said recesses, said other element abutting axially against the shoulder of said one element and against the shoulder portion of said first means.*

References Cited

The following references, cited by the Examiner, are of record in the patented file of this patent or the original patent.

UNITED STATES PATENTS

| | | | |
|---|---|---|---|
| 1,612,474 | 12/1926 | Strain | 81—5.1 X |
| 1,645,917 | 10/1927 | Maszczyk | 70—231 |
| 1,829,365 | 10/1931 | Meyer | 251—108 X |
| 1,878,569 | 9/1932 | Zolleis | 287—53 H |
| 3,384,339 | 5/1968 | Cornell | 251—291 |
| 3,453,897 | 7/1969 | Adinolfi | 137—296 X |

HENRY T. KLINKSIEK, Primary Examiner

R. GERARD, Assistant Examiner

U.S. Cl. X.R.

85—9; 292—347